United States Patent
Martinez Victoria

(12) 
(10) Patent No.: US 12,455,068 B1
(45) Date of Patent: Oct. 28, 2025

(54) VEHICLE LIGHT BAR

(71) Applicant: Ford Global Technologies, LLC, Dearborn, MI (US)

(72) Inventor: Marco A Martinez Victoria, Cuautitlan Izcal (MX)

( * ) Notice: Subject to any disclaimer, the term of this patent is extended or adjusted under 35 U.S.C. 154(b) by 0 days.

(21) Appl. No.: 19/032,616

(22) Filed: Jan. 21, 2025

(51) Int. Cl.
| | |
|---|---|
| *F21V 23/04* | (2006.01) |
| *B60Q 3/70* | (2017.01) |
| *F21S 4/28* | (2016.01) |
| *F21W 106/00* | (2018.01) |
| *F21Y 103/10* | (2016.01) |
| *F21Y 115/10* | (2016.01) |

(52) U.S. Cl.
CPC ............ *F21V 23/0471* (2013.01); *B60Q 3/70* (2017.02); *F21S 4/28* (2016.01); *B60Q 2900/30* (2013.01); *F21W 2106/00* (2018.01); *F21Y 2103/10* (2016.08); *F21Y 2115/10* (2016.08)

(58) Field of Classification Search
CPC ............ B60Q 3/70–78; B60Q 2900/30; F21S 4/00–28; F21V 23/04–0478; F21W 2106/00; F21Y 2103/10; F21Y 2115/00–30
See application file for complete search history.

(56) References Cited

U.S. PATENT DOCUMENTS

| | | | |
|---|---|---|---|
| 10,195,987 B2 * | 2/2019 | Berlitz | B60Q 3/80 |
| 11,500,378 B2 | 11/2022 | Kentley-Klay et al. | |
| 11,713,048 B2 | 8/2023 | Lisseman et al. | |
| 2017/0305349 A1 | 10/2017 | Naboulsi | |
| 2018/0297511 A1 | 10/2018 | Park et al. | |
| 2019/0366811 A1 | 12/2019 | O'Keeffe | |
| 2020/0223352 A1 | 7/2020 | Toshio Kimura et al. | |
| 2020/0231182 A1 | 7/2020 | Oba | |
| 2021/0162912 A1 | 6/2021 | Spero | |

(Continued)

FOREIGN PATENT DOCUMENTS

| | | |
|---|---|---|
| DE | 102014226254 A1 | 12/2014 |
| GB | 2517790 A | 3/2015 |
| KR | 20050031832200500 A | 9/2003 |

OTHER PUBLICATIONS

Yucheng Yang, et al., An HMI Concept to Improve Driver's Visual Behavior and Situation Awareness in Automated Vehicle, 2018 21st International Conference on Intelligent Transportation Systems (ITSC) Maui, Hawaii, USA, Nov. 4-7, 2018, pp. 650-655.

(Continued)

*Primary Examiner* — Jason M Han
(74) *Attorney, Agent, or Firm* — Frank Lollo; Eversheds Sutherland (US) LLP

(57) ABSTRACT

A vehicle including a light bar, a vehicle sensor and a processor is disclosed. The light bar may be disposed at a vehicle structural component in a vehicle interior portion. The light bar may be configured to illuminate a driver's upper body. The vehicle sensor may detect a driver's gesture in the vehicle interior portion. The processor may obtain inputs associated with the driver's gesture from the vehicle sensor, and determine that the driver's gesture is a predefined gesture based on the inputs. The processor may switch an operational state of the light bar from a deactivated state to an activated state responsive to determining that the driver's gesture is equivalent to the predefined gesture, to enable a user outside the vehicle to view the driver's gestures.

20 Claims, 4 Drawing Sheets

(56) References Cited

U.S. PATENT DOCUMENTS

2023/0356728 A1 11/2023 Jain et al.
2024/0227516 A1 7/2024 Moschek et al.
2024/0270267 A1 8/2024 Miyamichi et al.

OTHER PUBLICATIONS

Aditya Dandekar, et al., How to Display Vehicle Information to Users of Automated Vehicles When Conducting Non-Driving-Related Activities, https://dl.acm.org/doi/10. 1145/3546741, Sep. 2022, pp. 206.2-206.22.

Alexandros Rouchitsas, et al., External Human-Machine Interfaces for Autonomous Vehicle-to-Pedestrian Communication: a Review of Empirical Work, https://pmc.ncbi.nlm.nih.gov/articles/PMC6916419/pdf/fpsyg-10-02757.pdf, Dec. 10, 2019, pp. 1-12.

Srivatsan Chakravarthi Kumaran, et al., To Cross or Not-to-Cross: a Robotic Object for Mediating Interactions Between Autonomous Vehicles and Pedestrians, https://ieeexplore.ieee.org/document/10309309?source=IQplus, Nov. 2023, Abstract.

Amir Rasouli, et al., Agreeing to cross: How drivers and pedestrians communicate, https://ieeexplore.ieee.org/document/7995730?source=IQplus, Jun. 11-14, 2017, Abstract.

Amir Rasouli, et al., Agreeing to Cross: How Drivers and Pedestrians Communicate, https://arxiv.org/abs/1702.03555, Feb. 12, 2017, pp. 1-6.

Maarika Oidekivi, et al., Interpreting externally expressed intentions of an autonomous vehicle, https://ieeexplore.ieee.org/document/9538693?source=IQplus, Jul. 8-10, 2021, Abstract.

Azra Habibovic1, et al., Communicating Intent of Automated Vehicles to Pedestrians, https://pmc.ncbi.nlm.nih.gov/articles/PMC6090516/, Aug. 7, 2018, pp. 1-17.

Joshua E. Domeyer, et al., Vehicle Automation—Other Road User Communication and Coordination: Theory and Mechanisms, https://ieeexplore.ieee.org/document/8968342?source=IQplus, Jan. 31, 2020, pp. 19860-19872.

Vinay Malligere Shivanna, et al., Object Detection, Recognition, and Tracking Algorithms for ADASs—a Study on Recent Trends, https://pmc.ncbi.nlm.nih.gov/articles/PMC10781282/, Dec. 31, 2023, pp. 1-51.

Yang Li, et al., Autonomous Vehicles Drive into Shared Spaces: eHMI Design Concept Focusing on Vulnerable Road Users, https://ieeexplore.ieee.org/document/9564515?source=IQplus, Sep. 19-22, 2021, Abstract.

Juan Carmona, et al., eHMI: Review and Guidelines for Deployment on Autonomous Vehicles, https://pmc.ncbi.nlm.nih.gov/articles/PMC8122490/, Apr. 21, 2021, pp. 1-21.

* cited by examiner

VEHICLE LIGHT BAR

FIELD

The present disclosure relates to vehicles, and more particularly to a smart light bar in a vehicle that illuminates driver's upper body to enhance walker passage.

BACKGROUND

In urban environment, effective communication between a vehicle driver and a walker plays a crucial role in preventing adverse situations on a road network and ensuring smooth flow of traffic. Generally, the vehicle driver and the walker interact via vehicle components such as by using a vehicle horn, a vehicle light/indicator, etc. In addition, the vehicle driver and the walker interact by making eye contact or gestures (e.g., hand wave or nod) to clarify intentions.

However, in some scenarios, the conventional methods for communication/interaction may be ineffective due to visibility issues, glare, or environmental noise. This lack of clear communication can lead to confusion at walker crossings. For example, when a light source and windshield are aligned in certain positions, a glare may be produced that obstructs the view of the walker trying to make eye contact with the driver. This may make it difficult for the driver to communicate a courtesy pass-through hand gesture.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
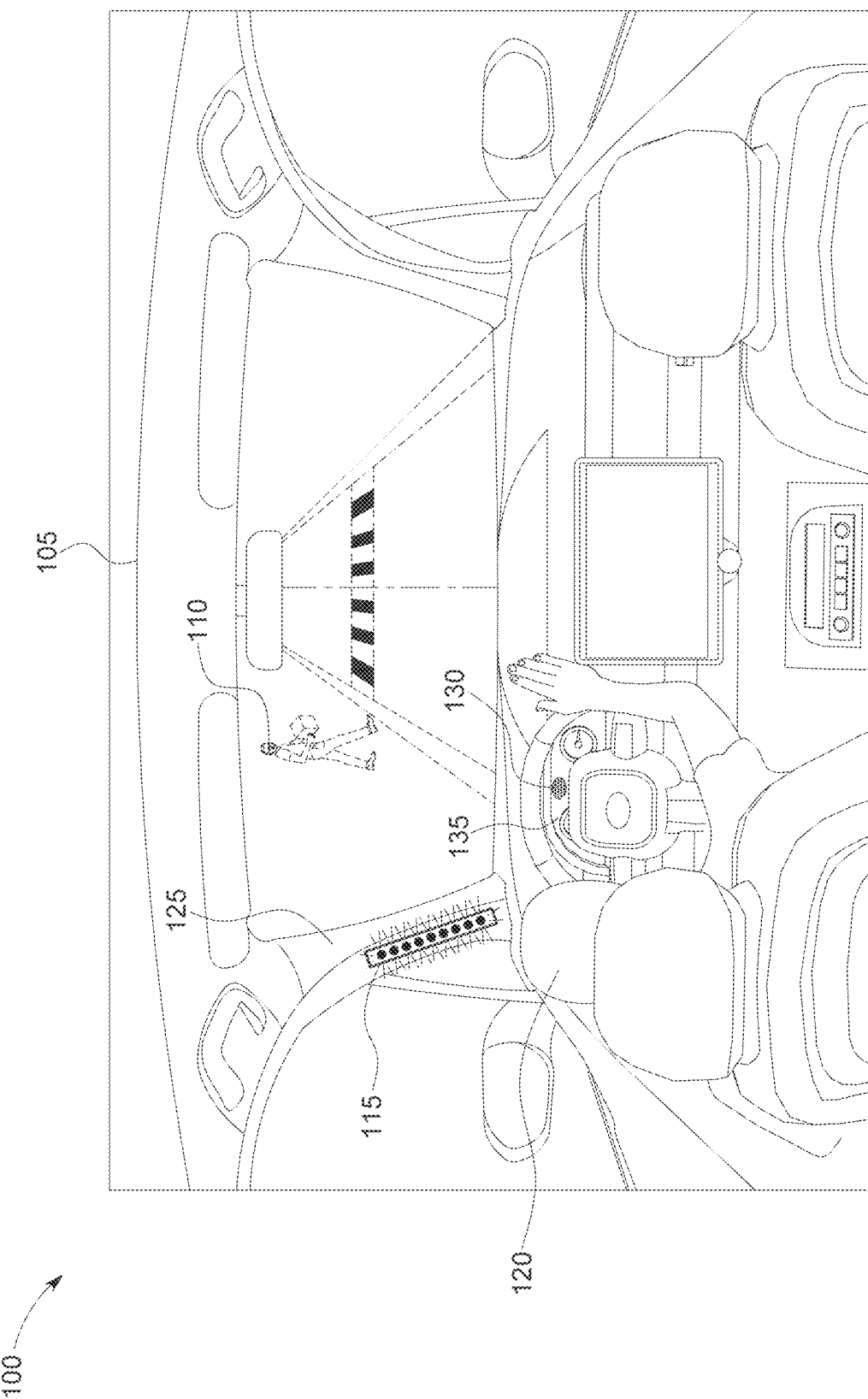
FIG. 1 depicts an example environment in which techniques and structures for providing the systems and methods disclosed herein may be implemented.

The present disclosure describes a vehicle's smart light bar (hereinafter referred to as "light bar") that may automatically illuminate a driver's body (e.g., a driver's upper body) when a driver makes a predefined gesture to interact with a walker outside the vehicle. The light bar illumination allows the walker to clearly view the driver's gestures (even when the ambient conditions may be dark), thereby enabling effective communication/interaction between the driver and the walker on a road network. The light bar may be located in a vehicle interior portion. In some aspects, the light bar may be disposed at a vehicle A-pillar to effectively illuminate the driver's upper body.

In some aspects, the vehicle may include a vehicle sensor that may detect/capture the driver's gesture (e.g., hand movement) that the driver may make to interact with the walker. The vehicle sensor may be any motion sensor that may be located in the vehicle interior portion. In some aspects, the vehicle sensor may be located in proximity to a vehicle instrument cluster (or an infotainment system) to effectively capture the driver's gestures.

The vehicle may further include an interaction unit that may facilitate interaction/communication between the driver and the walker, to enhance walker passage in proximity to the vehicle. The interaction unit ("unit") may obtain inputs from the vehicle sensor, and may operate the light bar based on the inputs obtained from the vehicle sensor. Specifically, the unit may first determine that the driver's gesture may be a predefined gesture to interact with the walker, and then control the light bar operation when the unit determines that the driver's gesture is equivalent to the predefined gesture. To determine that the driver's gesture is the predefined gesture, the unit may fetch information associated with a plurality of predefined gestures from a vehicle memory. Responsive to obtaining/fetching the information, the unit may compare the driver's gesture captured by the vehicle sensor with the plurality of predefined gestures. The unit may determine that the driver's gesture may be equivalent to any one predefined gesture, of the plurality of predefined gestures, based on the comparison described above.

Responsive to determining that the driver's gesture is equivalent to a predefined gesture, the unit may switch the light bar's operational state. Specifically, responsive to determining that the driver's gesture is equivalent to the predefined gesture, the unit may switch the light bar's operational state from a deactivated state to an activated state. Stated another way, the unit may turn-on the light bar when the unit determines that the driver is making specific gestures to interact with the walker. In some aspects, the unit may activate the light bar for a predefined time duration, and may deactivate the light bar after the predefined time duration lapses.

The present disclosure discloses a light bar that provides a clear visual signal that is easily noticeable by walkers, especially in low-light or high-traffic conditions, enhancing the visibility of the driver's intention. By positioning the light bar on the A-pillar and controlling the light bar activation, the present disclosure minimizes the windshield glare that may obstruct the driver and walkers' views, ensuring effective communication. The present disclosure further standardizes the communication between drivers and walkers, reducing ambiguity and misunderstandings that may occur with traditional hand gestures alone. In addition, by providing a reliable and clear method for indicating a courtesy pass, the present disclosure enhances the walkers' protection at crossings. Furthermore, the present disclosure leverages natural driver gestures, making it intuitive to use without requiring significant changes to driver behavior or additional training. The present disclosure can be adapted to different vehicle models and environments, making it a versatile solution for enhancing walker-driver interactions across various settings.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 that may be traveling near a walker crossing on a road network. The environment 100 may further include a walker 110 (or a user) who may be located in proximity to the vehicle 105 (e.g., in proximity to a vehicle front portion), and outside the vehicle 105.

The vehicle 105 may take the form of any passenger or commercial vehicle such as a car, a work vehicle, a crossover vehicle, a truck, a van, a minivan, a taxi, a bus, etc. The vehicle 105 may be a manually driven vehicle or may be configured to operate in a partially/fully autonomous mode. Further, the vehicle 105 may include any powertrain such as a gasoline engine, one or more electrically-actuated motor(s), a hybrid system, etc.

The vehicle 105 may include a light bar 115 that may be located in a vehicle interior portion, and may be configured to illuminate a driver 120 located in the vehicle interior portion. In an exemplary aspect, the light bar 115 may illuminate a driver's upper body (e.g., face, hands, etc.). The light bar 115 may be disposed at a vehicle structural component. In some aspects, the light bar 115 may be removably connected to the vehicle structural component. In other aspects, the light bar 115 may be integrated to the vehicle structural component. In an exemplary aspect, the vehicle structural component may be an A-pillar 125. The A-pillar 125 may be disposed at a vehicle's left portion, e.g., when the vehicle 105 is a left-hand drive vehicle. Alternatively, the A-pillar 125 may be disposed at a vehicle's right portion, e.g., when the vehicle 105 is a right-hand drive vehicle. In some aspects, the light bar 115 may be disposed on a portion of an A-pillar length.

In alternative aspects, the light bar 115 may be disposed at any other vehicle structural component, different from the A-pillar 125. In some aspects, the light bar 115 may include a light-emitting diode (LED) array including a plurality of LEDs. The LEDs may be RGB LEDs that may produce a wide range of colors.

The vehicle 105 may further include a vehicle sensor 130 that may detect a driver's gesture (e.g., a hand wave) in the vehicle interior portion. The vehicle sensor 130 may be a motion sensor that may detect the driver's gesture. For example, the vehicle sensor 130 may detect the driver's hand movement when the driver 120 attempts to interact with the walker 110 via a hand wave. The vehicle sensor 130 may be located in the vehicle interior portion. In some aspects, the vehicle sensor 130 may be located in proximity to a vehicle instrument cluster 135 to effectively capture the driver's gesture. Alternatively, the vehicle sensor 130 may be disposed at any other location in the vehicle interior portion.

The vehicle 105 may further include an interaction unit (shown as interaction unit 212 in FIG. 2) that may facilitate interaction/communication between the driver 120 and the walker 110, to enable the walker 110 to conveniently pass the crossing in front of the vehicle 105. The interaction unit ("unit") may obtain inputs from the vehicle sensor 130, and may operate the light bar 115 based on the inputs from the vehicle sensor 130 to facilitate the driver-walker interaction described above.

In some aspects, the unit may obtain inputs from vehicle sensor 130 indicating the driver's gesture, and determine whether the driver's gesture is one of a predefined gestures based on the obtained inputs. For example, the unit may determine whether the driver's gesture is a specific hand movement to interact with the walker 110 (e.g., a specific hand wave indicating to the walker 110 to pass the crossing while the vehicle 105 waits). In some aspects, to determine that the driver's gesture is one of the predefined gesture, the unit may fetch information associated with a plurality of predefined gestures from a vehicle memory (shown as memory 244 in FIG. 2). Responsive to obtaining/fetching the information, the unit may compare the driver's gesture captured by the vehicle sensor 130 with the plurality of predefined gestures. The unit may then determine that the driver's gesture is equivalent to the predefined gesture based on the comparison. For example, the unit may determine that the driver's gesture is the predefined gesture when the captured driver's gesture matches with at least one predefined gesture from the plurality of predefined gestures.

Responsive to determining that the driver's gesture is equivalent to the predefined gesture, the unit may switch an operational state of the light bar 115. Specifically, responsive to determining that the driver's gesture is equivalent to the predefined gesture, the unit may switch the light bar's operational state from a deactivated state (e.g., an OFF state) to an activated state (e.g., an ON state). Stated another way, the unit may turn-on the light bar 115 when the unit determines that the driver 120 is making specific gestures to interact with the walker 110.

In some aspects, the unit may control a power supply (shown as power supply 304 in FIG. 3) that may be configured to supply power to the light bar 115, to switch the light bar's operational state. For example, the unit may transmit a command signal to the power supply to activate/deactivate the light bar 115. In some aspects, the unit may activate the light bar 115 for a predefined time duration, and may deactivate the light bar 115 after the predefined time duration lapses.

Further vehicle 105 details are described below in conjunction with FIG. 2.

The vehicle 105 implements and/or performs operations, as described here in the present disclosure, in accordance with the owner manual and safety guidelines. In addition, any action taken by the driver 120 or the walker 110 based on the notifications provided by the vehicle 105 should comply with all the rules specific to the location and operation of the vehicle 105 (e.g., Federal, state, country, city, etc.). The notifications, as provided by the vehicle 105, should be treated as suggestions and only followed according to any rules specific to the location and operation of the vehicle 105.

Figure 2:
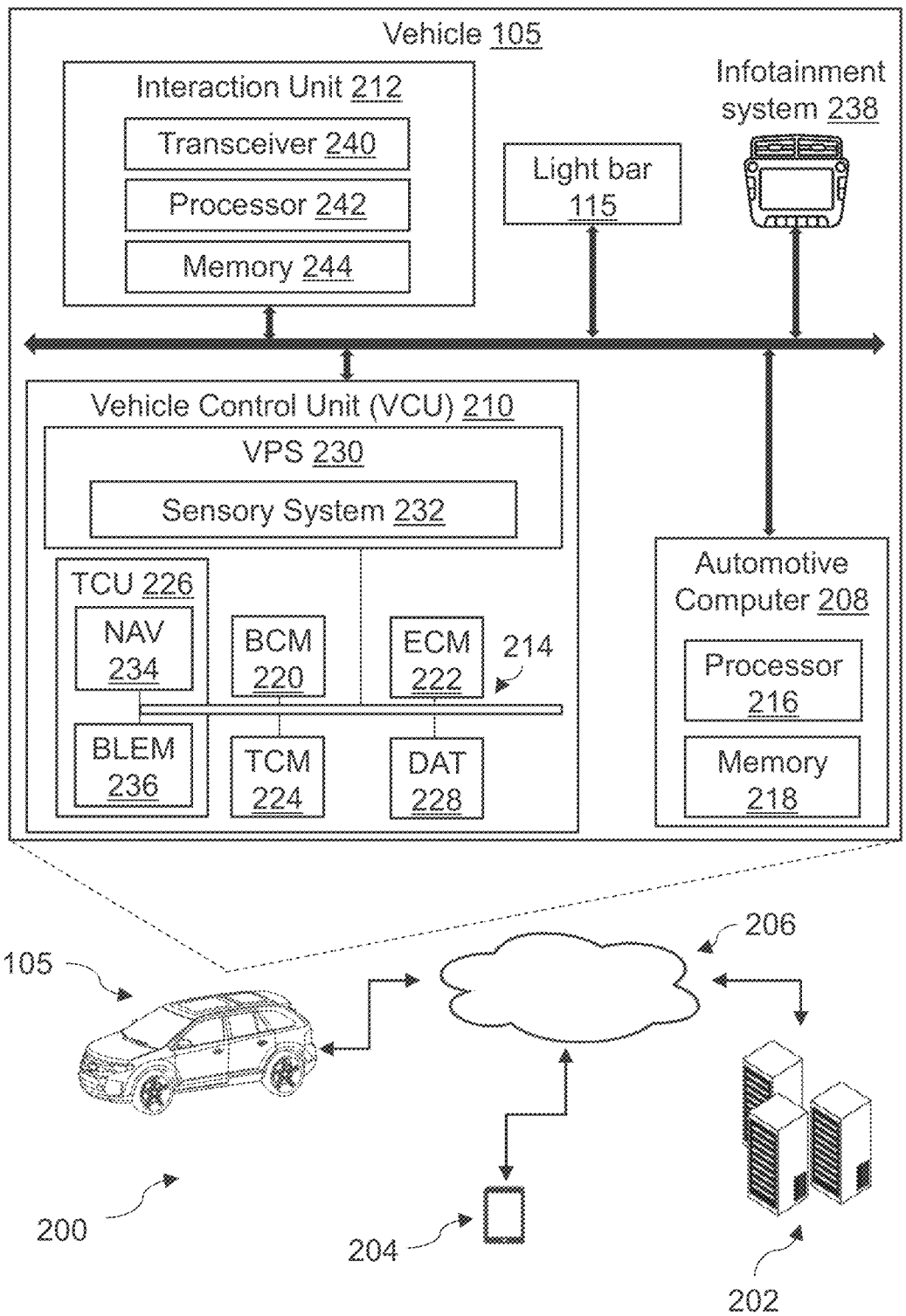
FIG. 2 depicts a block diagram of a system to control a light bar operation in accordance with the present disclosure.

FIG. 2 depicts a block diagram of a system 200 to control a light bar operation in accordance with the present disclosure.

The system 200 may include the vehicle 105, one or more servers 202 (or a server 202) and a user device 204 that may be communicatively coupled with each other via one or more networks 206. The user device 204 may be associated with the driver 120, and may include, for example, a mobile phone, a computer, a laptop, a tablet, a smartwatch or any other device with communication capabilities. The server 202 may be part of a cloud-based computing infrastructure and may be associated with and/or include a Telematics Service Delivery Network (SDN) that provides digital data services to the vehicle 105 and other vehicles (not shown) that may be part of a vehicle fleet.

In further aspects, the server 202 may store information associated with user preference(s) for switching ON the light bar 115 to illuminate the driver 120, which may be provided by the driver 120 to the server 202 via the user device 204 or a vehicle Human-Machine Interface (HMI). In an exemplary aspect, the information associated with the user preference may include information indicating the predefined time duration for which the light bar 115 may illuminate once the light bar 115 may be activated/turned-on. In addition, the user preference may include a preferred light color for light bar illumination, light intensity, and/or any preferred light illumination pattern.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 105 may include a plurality of units including, but not limited to, an automotive computer 208, a Vehicle Control Unit (VCU) 210 and an interaction unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 105, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a light bar management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 105 systems, connected servers (e.g., the server(s) 202), and other vehicles operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc.

The VCU 210 may further include and/or communicate with a Vehicle Perception System (VPS) 230, having connectivity with and/or control of one or more vehicle sensory system(s) 232 (or a "sensor unit"). The vehicle sensory system 232 may include one or more vehicle sensors including, but not limited to, a radio detection and ranging (radar) sensor configured for detection and localization of objects inside and outside the vehicle 105 using radio waves, sitting area buckle sensors, sitting area sensors, a light detecting and ranging (lidar) sensor, door sensors, proximity sensors, temperature sensors, wheel sensors, ambient weather sensors, ambient light sensors, vehicle internal and external cameras, one or more rain sensors, a humidity sensor, a tire pressure sensor, ultrasonic sensors, etc.

In some aspects, the vehicle sensory system 232 may include the vehicle sensor 130 described above in conjunction with FIG. 1, which may be a motion sensor that may capture driver's gesture (e.g., hand movement) in the vehicle interior portion. The motion sensor may include, but is not limited to, one or more infrared sensors, cameras, ultrasonic sensors, lidar sensors, radar sensors, and/or the like. In some aspects, the motion sensor may be located in proximity to the vehicle instrument cluster 135 (or an infotainment system 238) to effectively capture the driver's gesture. In addition, the vehicle sensory system 232 may include another vehicle sensor (e.g., a radar sensor, a lidar sensor, etc.) that may detect a walker presence in proximity to the vehicle 105 (e.g., in proximity to the vehicle's front portion). In some aspects, the other vehicle sensor may be located on a vehicle exterior portion.

The VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 105 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 105 and other systems (e.g., the user device 204, a key fob, an NFC device, etc.), computers, and modules. The NAV receiver 234 may determine a real-time vehicle geolocation. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as the light bar 115 (and other lights), windows, security, camera(s), fan, headlights, audio system(s), speakers, wipers, door locks and access control, mirrors, various comfort controls, enclosures, and/or the like. The BCM 220 may also operate as a gateway for bus and network interfaces to interact with remote ECUs (not shown in FIG. 2). In some aspects, the BCM 220 may control the power supply (which provides power to the light bar 115, shown as power supply 304 in FIG. 3) to activate or deactivate the light bar 115. For example, the BCM 220 may enable a connection between the power supply and the light bar 115 to activate the light bar 115, and may disable the connection between the power supply and the light bar 115 to deactivate the light bar 115.

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI) 238). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may further receive user instructions/inputs via the touchscreen interface portion and/or display notifications/recommendations, navigation maps, etc. on the touchscreen interface portion.

The vehicle 105 may further include the light bar 115. As described above in conjunction with FIG. 1, the vehicle 105 may switch ON the light bar 115 based on the inputs obtained from the motion sensor (that is part of the vehicle sensory system 232).

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 105, may include a transceiver 240, a processor 242, and a computer-readable memory 244.

The transceiver 240 may receive information/inputs from one or more external devices or systems, e.g., the user device 204, the server(s) 202, and/or the like via the network 206. For example, the transceiver 240 may receive the information associated with user preferences (as described above) from the server 202 and/or the user device 204 via the network 206. Further, the transceiver 240 may transmit notifications to the external devices or systems. In addition, the transceiver 240 may receive information/inputs from vehicle 105 components such as the infotainment system 238, the VCU 210, the vehicle sensory system 232 (including the motion sensor or the vehicle sensor 130) and/or the like. Further, the transceiver 240 may transmit notifications/command signals to the vehicle 105 components such as the VCU 210, the infotainment system 238, the BCM 220, the light bar 115, etc.

The processor 242 and the memory 244 may be the same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable medium or memory storing the light bar management program code. In some aspects, the memory 244 may store the information associated with user preferences described above.

In additional aspects, the memory 244 may store the information associated with the plurality of predefined gestures that may be used by the driver 120 to interact with the walker 110. For instance, the memory 244 may store information associated with a "stop" gesture in which the driver 120 may raise one arm with palm facing outwards and fingers extended, as shown in FIG. 1, which may be used to indicate the walker 110 to stop and allow the vehicle 105 to go first. Similarly, the memory 244 may store information associated with a "go" gesture in which the driver 120 may wave the user's hand to indicate the walker 110 to go first. As described above, such gestures may be used by the driver 120/walker 110 to interact with each other, thereby enabling smooth passage for the walker 110 at the crossing in proximity to the vehicle 105. The memory 244 may store information associated with additional predefined gestures (in addition to the "stop" and "go" gestures described above), to enable the driver 120 and the walker 110 to effectively interact with each other.

In operation, the light bar 115 may be in a deactivated state (or turned-off) when the vehicle 105 may be traveling on the road network (e.g., near a walker crossing). At this point, in some aspects, the vehicle sensor 130 may also be in a turned-off state. The processor 242 may activate (or turn-on) the vehicle sensor 130 when a predetermined condition may be met. For example, the processor 242 may activate the vehicle sensor 130 when the other vehicle sensor (that may be part of the vehicle sensory system 232) detects the walker presence in proximity to the vehicle 105 (e.g., a vehicle front portion). As another example, the processor 242 may activate (or turn-on) the vehicle sensor 130 when the light intensity (as detected by the vehicle sensory system 232) in the vehicle interior portion is less than a first threshold value, such as during night time. As yet another example, the processor 242 may activate (or turn-on) the vehicle sensor 130 when the vehicle 105 may stop at an intersection point (or near the walker crossing) on the road network.

In some aspects, the vehicle sensor 130 may start to monitor the driver's gestures (e.g., hand movements) in the vehicle interior portion that the driver 120 may be making to interact with the walker 110, when the processor 242 activates the vehicle sensor 130. In alternative aspects, the vehicle sensor 130 may always be in the activated state and continuously monitor/capture the driver's gestures, when the vehicle 105 may be switched ON. Stated another way, in this case, the processor 242 may not be required to "activate" the vehicle sensor 130 as the vehicle sensor 130 may always be in the activated state.

The vehicle sensor 130 may continuously transmit information associated with the captured driver's gesture to the transceiver 240, when the vehicle sensor 130 captures the driver's gestures. The transceiver 240 may receive the information associated with the driver's gesture from the vehicle sensor 130, and may transmit the information to the processor 242.

The processor 242 may obtain the driver's gesture from the transceiver 240. Since the processor 242 activates the vehicle sensor 130 when the predefined condition is met (as described above), the processor 242 may obtain the information associated with the driver's gestures from the vehicle sensor 130 when the predefined condition is met. For example, the processor 242 may obtain the information associated with the driver's gesture when the other vehicle sensor detects the walker presence in proximity to the vehicle 105 (e.g., the vehicle front portion), as described above. Specifically, in this case, the processor 242 may first obtain inputs from the other vehicle sensor, determine the walker presence in proximity to the vehicle 105 based on the obtained inputs, activate the vehicle sensor 130 responsive to determining the walker presence, and then obtain the information associated with the driver's gesture from the vehicle sensor 130. As another example, the processor 242 may obtain the information associated with the driver's gesture when the light intensity in the vehicle interior portion may be less than the first threshold value, such as during night time. As yet another example, the processor 242 may obtain the information associated with the driver's gesture when the vehicle 105 may be stopped at an intersection point (or near the walker crossing) on the road network.

Responsive to obtaining the information associated with the driver's gesture, the processor 242 may fetch the information associated with the plurality of predefined gestures from the memory 244. The processor 242 may then compare the driver's gesture captured by the vehicle sensor 130 with the plurality of predefined gestures based on the information, and determine that the driver's gesture may be equivalent to any one predefined gesture, of the plurality of predefined gestures, based on the comparison. Responsive to determining that the driver's gesture is equivalent to the predefined gesture, the processor 242 may control the light bar operation to facilitate the driver 120 to effectively interact with the walker 110.

In some aspects, the processor 242 may match the driver's gesture with the plurality of predefined gestures, and may control the light bar operation when the driver's gesture matches with any one of the predefined gestures. For example, when the driver 120 waves the driver's hand to signal the walker 110 to go first, the vehicle sensor 130 may capture the gesture and transmit the information associated with such gesture to the processor 242 (via the transceiver 240). The processor 242 may obtain inputs from the vehicle sensor 130, and compare the hand wave gesture with the predefined gestures stored in the memory 244. When the hand wave gesture matches with any one of the predefined gestures, the processor 242 may determine that the driver 120 may be interacting or desires to interact with the walker 110. Responsive to such determination, the processor 242 may control the light bar operation.

In some aspects, to control the light bar operation, the processor 242 may switch a light bar operational state from the deactivated state to the activated state, responsive to determining that the driver's gesture matches with any one of the plurality of predefined gestures (or responsive to determining that the driver's gesture is equivalent to a predefined gesture information of which may be stored in the memory 244). Stated another way, the processor 242 may activate/turn-on the light bar 115 when the driver 120 makes the predefined gesture to interact with the walker 110. In some aspects, the processor 242 may transmit a command signal to the ECU 214 (e.g., the BCM 220) to enable the connection between the power supply and the light bar 115 to activate/turn-on the light bar 115. The ECU 214 may receive the command signal from the processor 242 and may enable the connection between the power supply and the light bar 115 to activate/turn-on the light bar 115.

Upon activation, the light bar 115 may illuminate the driver 120 (specifically the driver's upper body including the face, hands, etc.), thereby enabling the walker 110 to clearly see the driver's gesture. In this manner, the processor 242 may enable effective communication/interaction between the driver 120 and the walker 110 even when the vehicle interior portion may be dark, by illuminating the light bar 115.

In some aspects, the processor 242 may turn-on the light bar 115 for a specific/predefined time duration (e.g., 3-10 seconds). Specifically, the processor 242 may calculate a time duration or start a timer responsive to switching the light bar's operational state from the deactivated state to the activated state, and compare the time duration with a second threshold value. The processor 242 may switch the light bar's operational state from the activated state back to the deactivated state when the time duration exceeds the second threshold value. In some aspects, the processor 242 may transmit another command signal to the ECU 214 (e.g., the BCM 220) to disable the connection between the power supply and the light bar 115 to deactivate/turn-off the light bar 115. Alternatively, the ECU 214 may automatically deactivate the light bar 115 after the specific/predefined time duration lapses.

In some aspects, the processor 242 may obtain the user/driver's preferences from the server 202 and/or the memory 244, and may control the light bar operation based on the user/driver's preferences. For example, the processor 242 may turn-on the light bar 115 for the time duration indicated/preferred by the driver 120. In addition, the processor 242 may activate the light bar 115 at a light intensity/color/pattern indicated in the user preferences by the driver 120.

In further aspects, the processor 242 may activate or illuminate one or more vehicle exterior components (e.g., vehicle exterior light, speaker, etc.) to provide a signal to the walker 110, when the processor 242 determines that the driver's gesture is equivalent to the predefined gesture.

Figure 3:
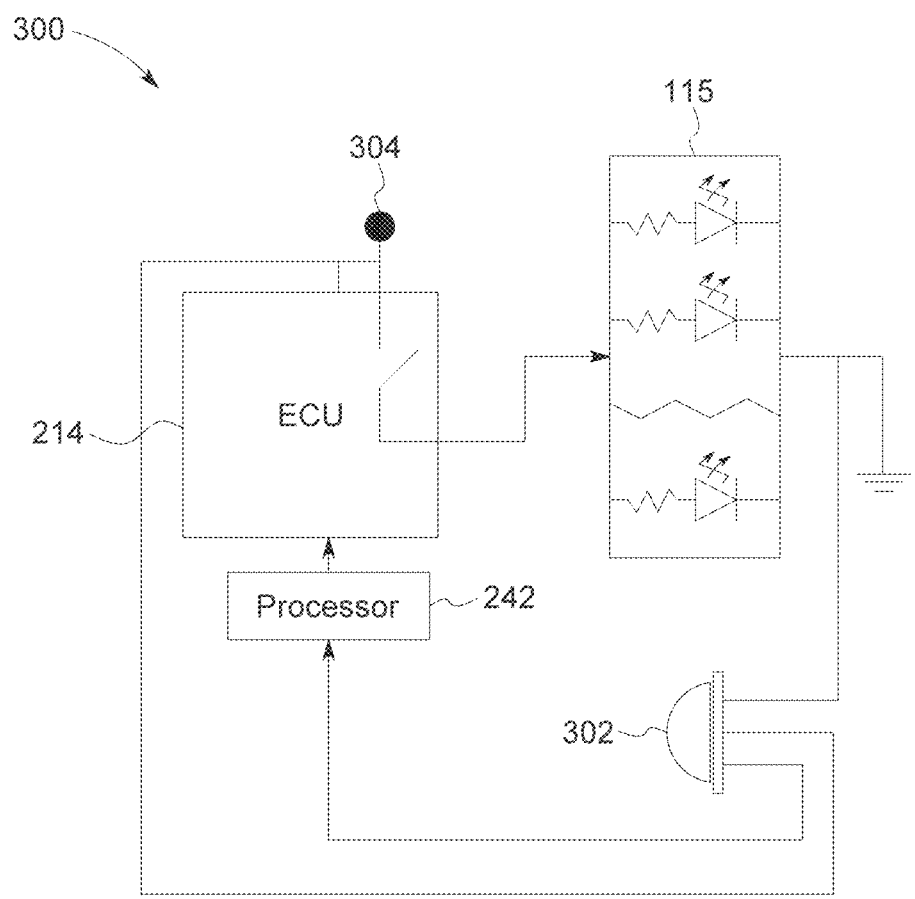
FIG. 3 depicts an example circuit for controlling a light bar in accordance with the present disclosure.

FIG. 3 depicts an example circuit 300 for controlling the light bar 115 operation in accordance with the present disclosure. The circuit 300 may include a motion sensor 302 (that may be the same as the vehicle sensor 130), the light bar 115, the processor 242, the ECU 214, and a power supply 304. The power supply 304 may supply power to the light bar 115. The light bar 115 may illuminate when the power supply 304 supplies power to the light bar 115. Stated another way, the light bar 115 may illuminate when the power supply 304 may be connected to the light bar 115. Further, the light bar 115 may not illuminate when the power supply 304 may be disconnected from the light bar 115.

As described above, the motion sensor 302 may detect the driver's gesture that the driver 120 may be making in the vehicle interior portion. When the motion sensor 302 detects the driver's gesture, the motion sensor 302 may transmit a signal indicative of the captured gesture to the processor 242 (e.g., via the transceiver 240). The processor 242 may obtain the signal and may compare the captured gesture with a plurality of predefined gestures (information of which may be pre-stored in the memory 244), as described above.

Responsive to determining that the driver's gesture is equivalent to any one of the predefined gestures, the processor 242 may switch the light bar's operational state from the deactivated state to the activated state. Specifically, in this case, the processor 242 may transmit a signal to the ECU 214 (e.g., BCM 220) to enable a connection between the power supply 304 and the light bar 115. The ECU 214 may obtain the signal and may enable the connection between the power supply 304 and the light bar 115 to switch the light bar operational state from the deactivated state to the activated state for a predefined time duration.

In further aspects, the ECU 214 may disable the connection between the power supply 304 and the light bar 115 to switch the light bar operational state from the activated state back to the deactivated state, after the predefined time duration lapses. The integration of the motion sensor 302 and the ECU 214 allows for automatic activation of the light bar 115 based on the specific hand gestures, reducing the need for manual intervention by the driver 120 and ensuring timely signals. The use of the ECU 214 further allows for potential integration with other vehicle systems, such as adaptive lighting or driver assistance technologies, enhancing overall functionality and user experience.

Figure 4:
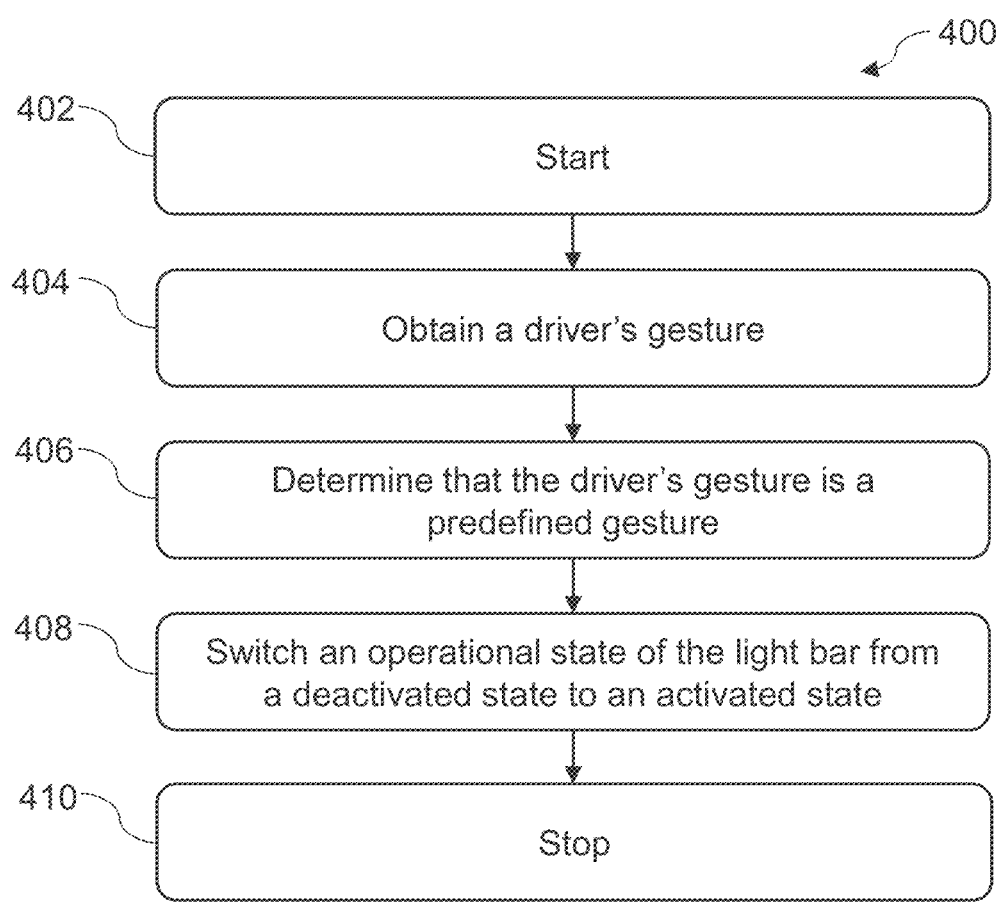
FIG. 4 depicts a flow diagram of an example method to control a light bar operation in accordance with the present disclosure.

FIG. 4 depicts a flow diagram of an example method 400 to control a light bar operation in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the processor 242, inputs associated with a driver's gesture from the vehicle sensor 130 (e.g., the motion sensor 302). At step 406, the method 400 may include determining, by the processor 242, that the driver's gesture is equivalent to a predefined gesture. For example, the processor 242 may fetch information associated with the plurality of predefined gestures from the memory 244, compare the driver's gesture with the plurality of predefined gestures, and determine that the driver's gesture is equivalent to the predefined gesture based on the comparison.

At step 408, the method 400 may include switching, by the processor 242, the light bar's operational state from the deactivated state to the activated state when the driver's gesture is equivalent to the predefined gesture, to enable the walker 110 outside the vehicle 105 to clearly view the driver's gestures. At the step 410, the method 400 stops.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a light bar disposed at a vehicle structural component in a vehicle interior portion, wherein the light bar is configured to illuminate a driver's upper body;
   a first vehicle sensor configured to detect a driver's gesture in the vehicle interior portion; and
   a processor configured to:
      obtain inputs associated with the driver's gesture from the first vehicle sensor;

determine that the driver's gesture is a predefined gesture based on the inputs; and
switch an operational state of the light bar from a deactivated state to an activated state to enable a user outside the vehicle to view the driver's gestures.

2. The vehicle of claim 1, wherein the vehicle structural component is a vehicle A-pillar.

3. The vehicle of claim 1, wherein the first vehicle sensor is located in proximity to a vehicle instrument cluster.

4. The vehicle of claim 1, wherein the first vehicle sensor is a motion sensor.

5. The vehicle of claim 1, further comprising a memory configured to store an information associated with a plurality of predefined gestures.

6. The vehicle of claim 5, wherein the processor is further configured to:
obtain the information associated with the plurality of predefined gestures from the memory;
compare the driver's gesture with the plurality of predefined gestures based on the information; and
determine that the driver's gesture is equivalent to the predefined gesture, of the plurality of predefined gestures, based on the comparison.

7. The vehicle of claim 1, wherein the processor is further configured to:
calculate a time duration responsive to switching the operational state of the light bar from the deactivated state to the activated state;
compare the time duration with a first threshold value; and
switch the operational state of the light bar from the activated state to the deactivated state when the time duration exceeds the first threshold value.

8. The vehicle of claim 1, further comprising a power supply configured to supply power to the light bar, wherein the processor is configured to control the power supply to switch the operational state.

9. The vehicle of claim 1, wherein the light bar comprises a light-emitting diode (LED) array comprising a plurality of LEDs.

10. The vehicle of claim 1, further comprising a second vehicle sensor configured to detect a user presence in proximity to the vehicle.

11. The vehicle of claim 10, wherein the processor is further configured to:
obtain second inputs from the second vehicle sensor;
determine the user presence in proximity to the vehicle based on the second inputs; and
obtain the inputs associated with the driver's gesture from the first vehicle sensor responsive to determining the user presence in proximity to the vehicle.

12. The vehicle of claim 1, wherein the processor is further configured to:
determine that a light intensity in the vehicle interior portion is less than a second threshold value responsive to determining that the driver's gesture is equivalent to the predefined gesture; and
obtain the inputs associated with the driver's gesture from the first vehicle sensor responsive to determining that the light intensity in the vehicle interior portion is less than the second threshold value.

13. A method comprising:
obtaining, by a processor, inputs associated with a driver's gesture from a first vehicle sensor of a vehicle, wherein the first vehicle sensor is configured to detect the driver's gesture in a vehicle interior portion;
determining, by the processor, that the driver's gesture is a predefined gesture based on the inputs; and
switching, by the processor, an operational state of a light bar from a deactivated state to an activated state to enable a user outside the vehicle to view the driver's gestures, wherein the light bar disposed at a vehicle structural component in the vehicle interior portion, and wherein the light bar is configured to illuminate a driver's upper body.

14. The method of claim 13, wherein the vehicle structural component is a vehicle A-pillar.

15. The method of claim 13, wherein the first vehicle sensor is located in proximity to a vehicle instrument cluster.

16. The method of claim 13, further comprising:
obtaining an information associated with a plurality of predefined gestures from a memory;
comparing the driver's gesture with the plurality of predefined gestures based on the information; and
determining that the driver's gesture is equivalent to the predefined gesture, of the plurality of predefined gestures, based on the comparison.

17. The method of claim 13, further comprising:
calculating a time duration responsive to switching the operational state of the light bar from the deactivated state to the activated state;
comparing the time duration with a first threshold value; and
switching the operational state of the light bar from the activated state to the deactivated state when the time duration exceeds the first threshold value.

18. The method of claim 13, further comprising controlling a power supply to switch the operational state, wherein the power supply is configured to supply power to the light bar.

19. The method of claim 13, further comprising:
obtaining second inputs from a second vehicle sensor configured to detect a user presence in proximity to the vehicle;
determining the user presence in proximity to the vehicle based on the second inputs; and
obtaining the inputs associated with the driver's gesture from the first vehicle sensor responsive to determining the user presence in proximity to the vehicle.

20. A non-transitory computer-readable storage medium having instructions stored thereupon which, when executed by a processor, cause the processor to:
obtain inputs associated with a driver's gesture from a first vehicle sensor of a vehicle, wherein the first vehicle sensor is configured to detect the driver's gesture in a vehicle interior portion;
determine that the driver's gesture is a predefined gesture based on the inputs; and
switch an operational state of a light bar from a deactivated state to an activated state responsive to determining that the driver's gesture is equivalent to the predefined gesture, to enable a user outside the vehicle to view the driver's gestures, wherein the light bar disposed at a vehicle structural component in the vehicle interior portion, and wherein the light bar is configured to illuminate a driver's upper body.

* * * * *